No. 885,833. PATENTED APR. 28, 1908.
J. T. BRETT.
HARVESTER REEL.
APPLICATION FILED FEB. 19, 1906.
3 SHEETS—SHEET 2.
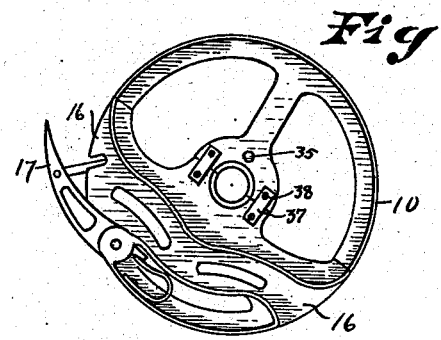
Fig. 3.
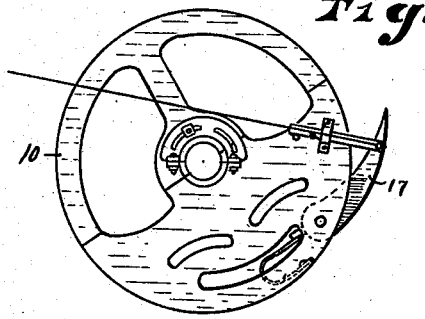
Fig. 4.
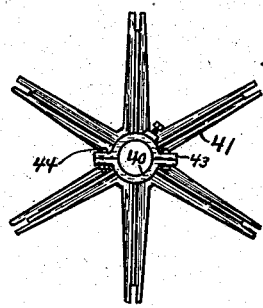
Fig. 5.
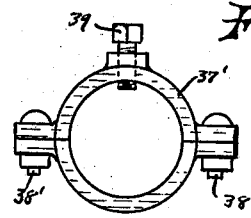
Fig. 9.
Fig. 6.
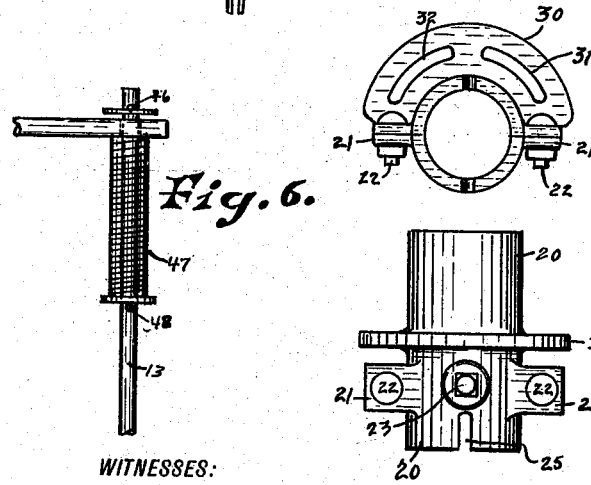
Fig. 7.
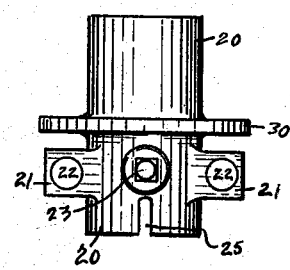
Fig. 8.
WITNESSES:
O. R. Erwin
M. M. Schultz
INVENTOR
James T. Brett
BY
Erwin & Wheeler
ATTORNEYS

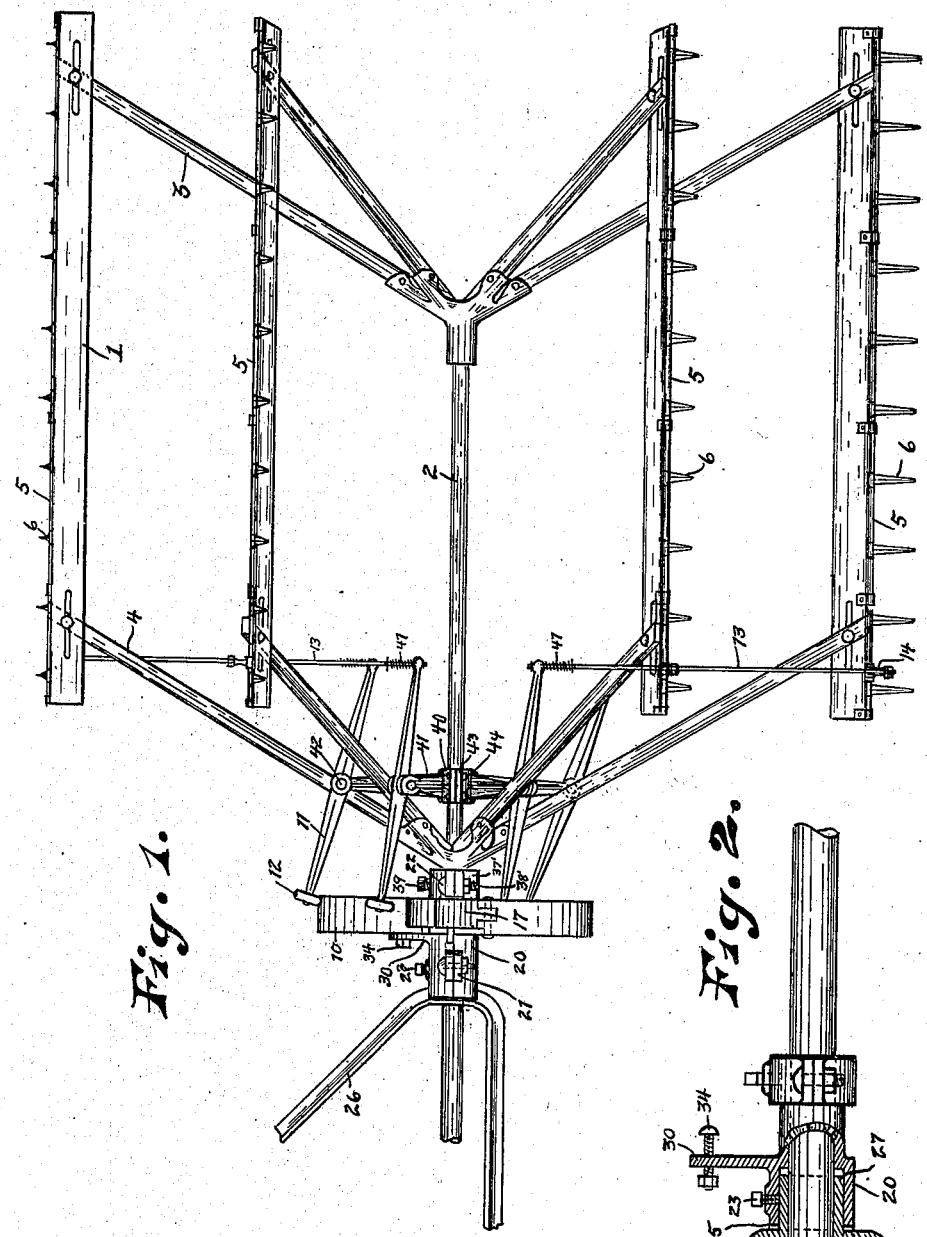

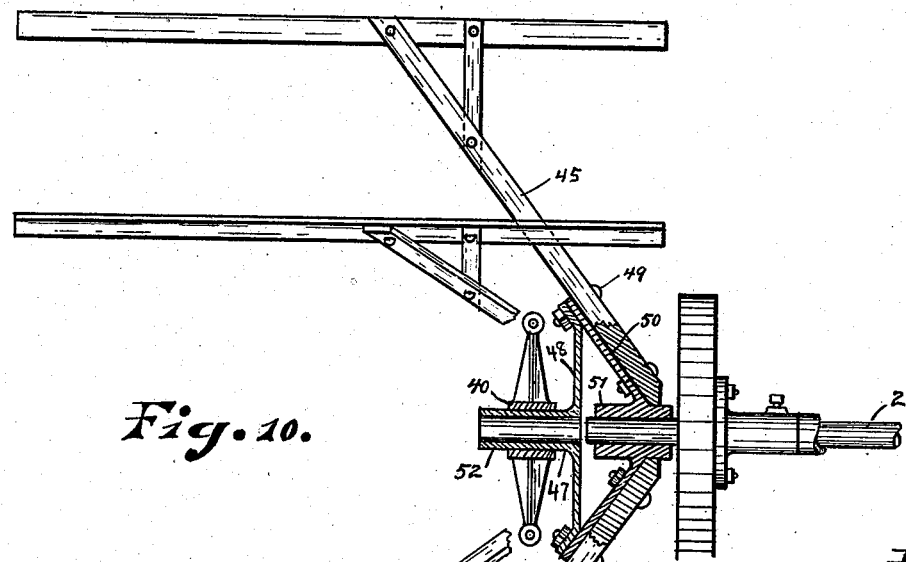
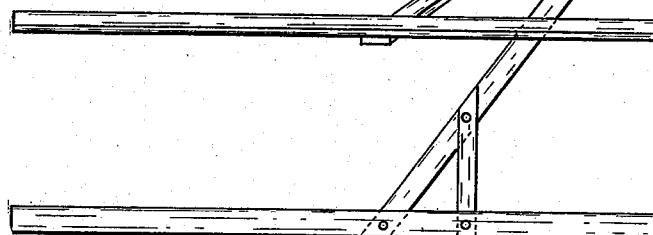
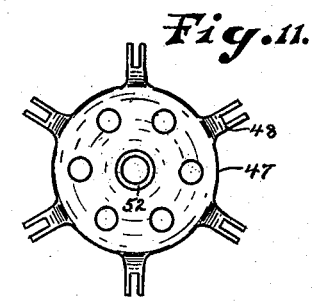
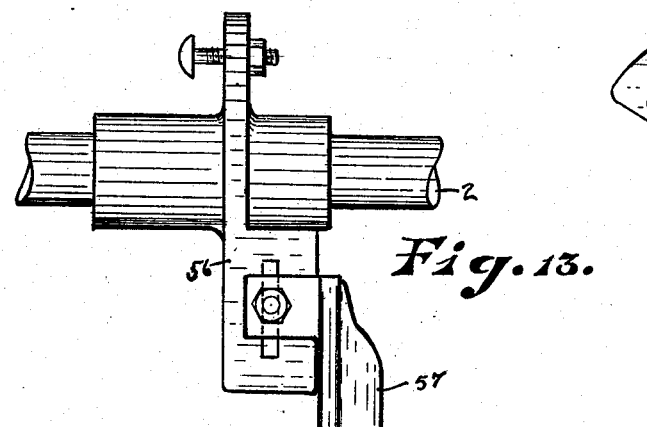
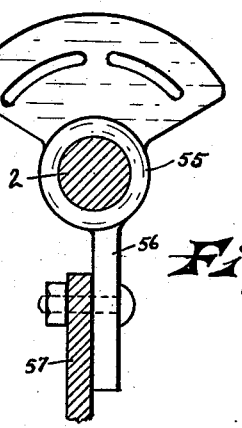

UNITED STATES PATENT OFFICE.

JAMES T. BRETT, OF MILWAUKEE, WISCONSIN.

HARVESTER-REEL.

No. 885,833.      Specification of Letters Patent.      Patented April 28, 1908.

Application filed February 19, 1906. Serial No. 301,745.

*To all whom it may concern:*

Be it known that I, JAMES T. BRETT, a citizen of the United States, residing at Milwaukee, county of Milwaukee, and State of Wisconsin, have invented new and useful Improvements in Attachments for Harvester-Reels, of which the following is a specification.

My invention relates to attachments for harvester reels of that class shown and described in Letters Patent of the United States, #746,534, issued to William Henry Lightcap, December 8, 1903. My invention is also divisional to an application executed by me and bearing even date herewith, which shows, describes and claims certain features of the apparatus illustrated herein.

The object of the invention is to improve the construction illustrated in said former patent and adapt it to be used in connection with harvester reels of various styles, whereby the apparatus may be readily attached without material alterations in the structure of the reels.

In the following description reference is had to the accompanying drawings, in which,—

Figure 1 is a side view illustrating my invention as it is applied to a reel having inner and outer sets of radial arms. Fig. 2 is a detail view partly in section, of the cam supporting sleeve. Figs. 3 and 4 are side views of the cam for operating the rake teeth for picking up fallen grain. Fig. 5 is a detail view of the spider frame, which supports the rake operating levers. Fig. 6 is an enlarged detail view of the connections for actuating the rake teeth. Fig. 7 is a detail view of the cam supporting sleeve as seen from the inner end. Fig. 8 is a detail top view of the cam supporting sleeve. Fig. 9 is a detail view of the reinforcing collar for holding the cam in position. Fig. 10 is a general side view illustrating the application of my invention to a reel having a single set of radial arms. Fig. 11 is a detail view of a bracket upon which the lever supporting spider in Fig. 10 is mounted. Fig. 12 is a detail view of a slightly modified form of cam supporting sleeve. Fig. 13 is a detail view of a modified means for holding the cam supporting sleeve against rotation.

Like parts are identified by the same reference characters throughout the several views.

Referring to Fig. 1, it will be observed that the reel bars 1 are supported from a rotary shaft 2 by two sets of radial arms 3 and 4, this being a style of reel in common use. Rods 5 journaled in suitable bearings on each of the reel bars are provided with teeth 6 used for picking up fallen grain as shown and described in the patent above referred to. The teeth 6 are swung outwardly to pick up the grain and then backwardly to release the grain and avoid tangling therein on the upwardly moving side of the reel. Motion is communicated to the rake teeth from a stationary cam 10 by means of operating levers 11, which are provided with rollers 12, traveling upon the cam and links 13, connected with suitable arms 14 on the rods 5. As the reel is rotated, the rollers 12 travel around the cam 10 and are adapted to enter a cam groove 16, whereby the ends of the levers having the rollers are caused to swing inwardly toward the reel shaft, thus swinging the rake teeth outwardly. A switch 17, pivotally connected with the cam 10, is employed to direct the rollers 12 either in an eccentric path through the cam groove, or in a circular path around the entire outer surface of the cam, the switch having an outer surface adapted to form a continuation of the cam periphery when the switch is closed over the admission end of the cam groove. The switch is closed when it is desired that the rake teeth shall remain in in-operative position, and opened when it is desired to operate the rake teeth to pick up the grain. The rollers are pushed inwardly by the walls of the cam groove when traveling through it, thus communicating motion through the levers 11 to swing the teeth 6 outwardly.

The cam 10 is secured in position on the reel shaft 2 by means of a clamping sleeve 20, which is formed in sections, each section having outwardly projecting lips 21, which are adapted to be secured together by bolts 22 to bind the members of the sleeve upon a hub 27 connected with the stationary brace 26. The sleeve is provided with a set screw 23, which is also used to bind it upon the sleeve 27, and a notch 25 (see Fig. 8) receives a flange on the stationary brace 26 (Fig. 1) for the same purpose. The cam 10 is also formed in sections, the two parts being connected by links 37 and screws 38, the links being applied after the cam has been adjusted to the outer end of the sleeve 20. The cam is then rigidly secured to the flange 30 by a bolt 34 inserted through the slot 31 (or 32) and through an aperture 35 in the cam.

The slots 31 and 32 permit a considerable range of cam adjustment to vary the time of operating the rake teeth. A divided collar 37' is also preferably clamped upon the outer end of the sleeve 20 by bolts 38' and secured by a set screw 39, whereby the cam 10 is more rigidly held in position against the flange 30. The operating levers 11 are fulcrumed to a spider frame comprising a collar 40 rigidly clamped upon and turning with the reel shaft 2, and radial arms 41, the outer ends of these arms being forked for the reception of the levers 11, which are secured in position by fulcrum pins 42. The collar 40 is divided and the parts secured together by means of the outwardly projecting lips 43 and clamping bolts 44. With this construction, the spider frame may be adjusted to the shaft 2 at a point beyond the radial arms 4 of the reel, with the levers 11 extending between said arms, and it is not necessary to take the reel apart in order to apply the cam and spider frame thereto. The rods 13 are preferably extended loosely through the outer arms of the levers with cross pins 46 to prevent their withdrawal, and buffer springs 47 are interposed between the levers and a cross pin 48, thus permitting independent movement of the rake teeth in case they should strike an obstruction, the springs being sufficiently strong to resist compression, except under unusual strain.

Referring to Fig. 10 which shows a reel having a single set of radial arms 45, and a reel shaft 2, which terminates in, or adjacent to the reel bearings, it will be observed that my invention may be applied thereto by providing a bracket 47 having forked arms 48 adapted to fit the inner surfaces of the reel bars 45, so that the bracket can be secured to the reel bars by means of the outer bolts 49, which connect such bars with arms 50 on the bearing sleeve 51 of the reel. This bracket 47 is provided with a centrally projecting stud shaft 52, which is in alinement with the shaft 3 when the bracket is secured to the reel. This stud shaft 52 is adapted to receive the collar 40 of the spider frame. The bracket is comparatively in-expensive and is quickly adjusted in position, with much less expense than would be incurred by providing an elongated reel shaft 2 for the reel shown in Fig. 10.

Referring to Figs. 12 and 13, it will be observed that a cam sleeve 55 may be employed where the construction of the reel is such that the sleeve may be slipped on over the end of the reel shaft 2. This sleeve differs from the sleeve shown in Fig. 8 by being formed integrally. It may also be provided with an arm 56 bolted to a stationary brace 57 where the brace 26 shown in Fig. 1 is not employed.

With the above described construction it will be obvious that my invention may be employed in connection with any of the reels in common use, and may be applied to machines already in use without material alterations in the structure of such machines. By providing a spider frame, and means for locating the same beyond the inner set of reel arms with the rake operating levers extending between such arms, a compact structure is produced and the excessive strains avoided which are incurred where the rake operating connections are located between the reel and the machine from which it is supported.

Having thus described my invention what I claim as new and desire to secure by Letters Patent is,—

1. In apparatus of the described class, the combination with a reel shaft and a reel provided with radial reel arms and oscillating rake teeth; of a cam mounted upon a suitable support adjacent to the inner bearing of the radial arms of the reel; a spider frame located on the reel shaft within the reel and beyond said bearing and having radially projecting arms; tooth actuating levers fulcrumed to said radial arms extending between said reel arms into operative relation to said cam; and connections between said levers and the rake teeth.

2. In apparatus of the described class, the combination with a reel shaft and a reel provided with radial reel arms and oscillating rake teeth; of a cam mounted upon a suitable support adjacent to the inner bearing of the radial arms of the reel; a spider frame located on the reel shaft within the reel and beyond said bearing and having radially projecting arms; tooth actuating levers fulcrumed to said spider frame arms and extending between said reel arms into operative relation to said cam; and connections between said levers and the rake teeth; said cam, the support therefor, and the lever supporting frames, being each formed in sections and adapted to be connected with the reel shaft without removing the reel.

3. In apparatus of the described class, the combination with a reel shaft and reel provided with adjustable rake teeth,—of a stationary cam, a set of actuating levers bearing upon said cam at one end, a support for said levers rigidly connected with the reel shaft, and motion transmitting connections between said levers and the rake teeth adapted to permit said teeth to yield when subjected to unusual strain.

4. In apparatus of the described class, the combination with a reel shaft and a reel having radial arms provided with adjustable rake teeth,—of a stationary cam, a web connected with said radial reel arms and provided with a stud shaft in axial alinement with the reel shaft, a support for said levers rigidly mounted upon the said shaft, a motion transmitting rod for each set of rake teeth adapted to communicate motion thereto from the corresponding lever, said rods being passed loosely through one of the points of connection and provided with a buffer spring adapted to permit an independent movement of the rake teeth when subjected to an unusual strain.

5. In apparatus of the described class, the combination with a reel shaft and a reel provided with adjustable rake teeth, of a stationary cam; a set of actuating levers in operative relation to said cam; a support for said levers rigidly connected with the reel shaft; and a rod for each set of rake teeth connecting such teeth with one of the levers; said rods being passed loosely through the levers and provided with buffer springs adapted to permit an independent movement of the rake teeth when subjected to unusual strain.

In testimony whereof I affix my signature in the presence of two witnesses.

JAMES T. BRETT.

Witnesses:
LEVERETT C. WHEELER,
JAS. B. ERWIN.